US011140524B2

(12) United States Patent
Torres et al.

(10) Patent No.: US 11,140,524 B2
(45) Date of Patent: Oct. 5, 2021

(54) VEHICLE TO VEHICLE MESSAGING

(71) Applicant: INTERNATIONAL BUSINESS MACHINES CORPORATION, Armonk, NY (US)

(72) Inventors: Isa M. Torres, Poughkeepsie, NY (US); Andrew R. Freed, Cary, NC (US); Timothy J. Hahn, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 16/448,222

(22) Filed: Jun. 21, 2019

(65) Prior Publication Data
US 2020/0404462 A1 Dec. 24, 2020

(51) Int. Cl.
*H04W 4/12* (2009.01)
*G10L 15/18* (2013.01)
(Continued)

(52) U.S. Cl.
CPC ............... *H04W 4/12* (2013.01); *B60Q 9/00* (2013.01); *G10L 15/1815* (2013.01);
(Continued)

(58) Field of Classification Search
CPC ........... H04W 4/12; H04W 4/06; H04W 4/08; H04W 4/46; H04W 4/48; H04W 4/90;
(Continued)

(56) References Cited

U.S. PATENT DOCUMENTS 8,718,797 B1 * 5/2014 Addepalli ........... H04L 43/0811
700/17
9,188,449 B2 11/2015 Biswal et al.
(Continued)

FOREIGN PATENT DOCUMENTS

GB 2561724 A 10/2018

OTHER PUBLICATIONS

Mell et al., "The NIST Definition of Cloud Computing," National Institute of Standards and Technology, Sep. 2011, pp. 1-3, Special Publication 800-145.
(Continued)

*Primary Examiner* — James N Fiorillo
(74) *Attorney, Agent, or Firm* — Robert D. Bean

(57) ABSTRACT

A computer-implemented method for vehicle to vehicle messaging. The method captures a voice command of a user in a first vehicle, and extracts an intent, a target recipient, and a message payload from the captured voice command of the user, using natural language processing. The method further analyzes video content from one or more cameras of the first vehicle, and identifies the target recipient relevant to the captured voice command, based on the analyzed video content. The method further transmits the message payload to the identified target recipient based on the extracted intent. In one embodiment, the message payload is transmitted to the target recipient via peer-to-peer communication, together with one or more segments of the analyzed video content and is displayed on a user interface of the identified target recipient.

17 Claims, 5 Drawing Sheets

(51) Int. Cl.
*B60Q 9/00* (2006.01)
*G08G 1/0967* (2006.01)
*G10L 15/22* (2006.01)
*G06F 3/16* (2006.01)

(52) U.S. Cl.
CPC ....... *G06F 3/167* (2013.01); *G08G 1/096741* (2013.01); *G08G 1/096791* (2013.01); *G10L 2015/223* (2013.01); *G10L 2015/226* (2013.01)

(58) Field of Classification Search
CPC ....... H04W 4/04; H04W 4/24; H04W 88/022; H04W 88/025; B60Q 9/00; G10L 15/1815; G10L 2015/223; G10L 2015/226; G10L 15/18; G10L 15/22; G08G 1/096741; G08G 1/096791; G08G 1/0129; G08G 1/164; G08G 1/166; G08G 1/017; G08G 1/162; G06F 3/167; G06F 3/16; H04N 5/23203; H04N 5/23206
USPC ........................................................ 709/206
See application file for complete search history.

(56) References Cited

U.S. PATENT DOCUMENTS

| | | | | |
|---|---|---|---|---|
| 10,091,545 | B1 | 10/2018 | Cwik | |
| 10,580,298 | B1* | 3/2020 | Amacker | G08G 1/096775 |
| 2007/0005609 | A1* | 1/2007 | Breed | B60N 2/2863 |
| 2007/0162550 | A1* | 7/2007 | Rosenberg | H04L 51/04 |
| | | | | 709/206 |
| 2008/0287092 | A1* | 11/2008 | Rindsberg | H04W 88/025 |
| | | | | 455/344 |
| 2009/0234859 | A1* | 9/2009 | Grigsby | G08G 1/161 |
| 2011/0251768 | A1* | 10/2011 | Luo | G08G 1/16 |
| | | | | 701/70 |
| 2015/0070503 | A1* | 3/2015 | Kraeling | H04N 5/23203 |
| | | | | 348/148 |
| 2015/0312400 | A1* | 10/2015 | Hansen | G06K 9/00536 |
| | | | | 455/414.1 |
| 2016/0012727 | A1* | 1/2016 | Bostick | G08G 1/162 |
| | | | | 340/903 |
| 2016/0104486 | A1* | 4/2016 | Penilla | G10L 15/005 |
| | | | | 704/232 |
| 2016/0371553 | A1* | 12/2016 | Farnham, IV | G07C 5/008 |
| 2017/0032402 | A1* | 2/2017 | Patsiokas | G06Q 30/0261 |
| 2017/0101054 | A1 | 4/2017 | Dusane | |
| 2017/0286785 | A1* | 10/2017 | Schaffer | B60K 37/06 |
| 2018/0081352 | A1* | 3/2018 | Astigarraga | B64C 39/024 |
| 2018/0182380 | A1 | 6/2018 | Fritz et al. | |
| 2018/0204459 | A1* | 7/2018 | Bradley | G08G 1/164 |
| 2018/0226077 | A1* | 8/2018 | Choi | B60K 35/00 |
| 2018/0300567 | A1* | 10/2018 | Qin | G06K 9/00825 |
| 2019/0027147 | A1 | 1/2019 | Diamant et al. | |
| 2019/0096244 | A1* | 3/2019 | Guruva Reddiar | G08G 1/096775 |
| 2019/0122543 | A1* | 4/2019 | Matus | G08G 1/0112 |
| 2019/0288917 | A1* | 9/2019 | Ricci | G01C 21/20 |
| 2019/0295542 | A1* | 9/2019 | Huang | G10L 15/30 |
| 2019/0297045 | A1* | 9/2019 | Orsini | H04W 4/024 |
| 2019/0306680 | A1* | 10/2019 | Doggart | H04W 4/08 |
| 2020/0008028 | A1* | 1/2020 | Yang | H04W 4/48 |
| 2020/0196126 | A1* | 6/2020 | Kim | H04W 4/90 |

OTHER PUBLICATIONS

Zheng et al., "Intent Detection and Semantic Parsing for Navigation Dialogue Language Processing," IEEE 20th International Conference on Intelligent Transportation Systems (ITSC), 2017, 6 Pages.

* cited by examiner

VEHICLE TO VEHICLE MESSAGING

BACKGROUND

The present disclosure relates generally to the field of cognitive computing and more particularly to data processing and dynamic messaging between one or more target vehicles based on user commands.

Nowadays, vehicles are equipped with various sensors, including cameras that are capable of detecting the surrounding environment. For example, self-driving and smart cars incorporate these various sensors and cameras into their models in order for the smart car to take appropriate actions in changing circumstances, such as speed and direction adjustment, object recognition, and collision avoidance.

However, there is no effective mechanism for drivers of smart cars to interact with each other on the road. For instance, a horn blast is the most common mechanism to get another driver's attention, and this action carries significant ambiguity as well as high distraction and noise pollution.

SUMMARY

Embodiments of the present invention disclose a method, a computer program product, and a system.

A method, according to an embodiment of the invention, in a data processing system including a processor and a memory. The method includes capturing a voice command of a user in a first vehicle, and extracting an intent, a target recipient, and a message payload from the captured voice command of the user using natural language processing. The method further includes analyzing video content from one or more cameras of the first vehicle, and identifying the target recipient relevant to the captured voice command, based on the analyzed video content. The method further includes transmitting the message payload to the target recipient based on the extracted intent.

A computer program product, according to an embodiment of the invention, includes a non-transitory tangible storage device having program code embodied therewith. The program code is executable by a processor of a computer to perform a method. The method includes capturing a voice command of a user in a first vehicle, and extracting an intent, a target recipient, and a message payload from the captured voice command of the user using natural language processing. The method further includes analyzing video content from one or more cameras of the first vehicle, and identifying the target recipient relevant to the captured voice command, based on the analyzed video content. The method further includes transmitting the message payload to the target recipient based on the extracted intent.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes capturing a voice command of a user in a first vehicle, and extracting an intent, a target recipient, and a message payload from the captured voice command of the user using natural language processing. The method further includes analyzing video content from one or more cameras of the first vehicle, and identifying the target recipient relevant to the captured voice command, based on the analyzed video content. The method further includes transmitting the message payload to the target recipient based on the extracted intent.

DETAILED DESCRIPTION

The present disclosure discloses a method that bridges the gaps in smart car technology, natural language processing, and object recognition to build a hybrid solution that allows one or more users on highways and roads to communicate with each other by simple voice commands within their own vehicles.

The present disclosure describes a conversational user interface that allows a driver to interact with other drivers on the highways and roads simply by using the vehicle's abilities to resolve references to objects within the surrounding environment of the vehicle.

Hereinafter, exemplary embodiments of the present disclosure will be described in detail with reference to the attached drawings.

The present disclosure is not limited to the exemplary embodiments below, but may be implemented with various modifications within the scope of the present disclosure. In addition, the drawings used herein are for purposes of illustration, and may not show actual dimensions.

Figure 1:
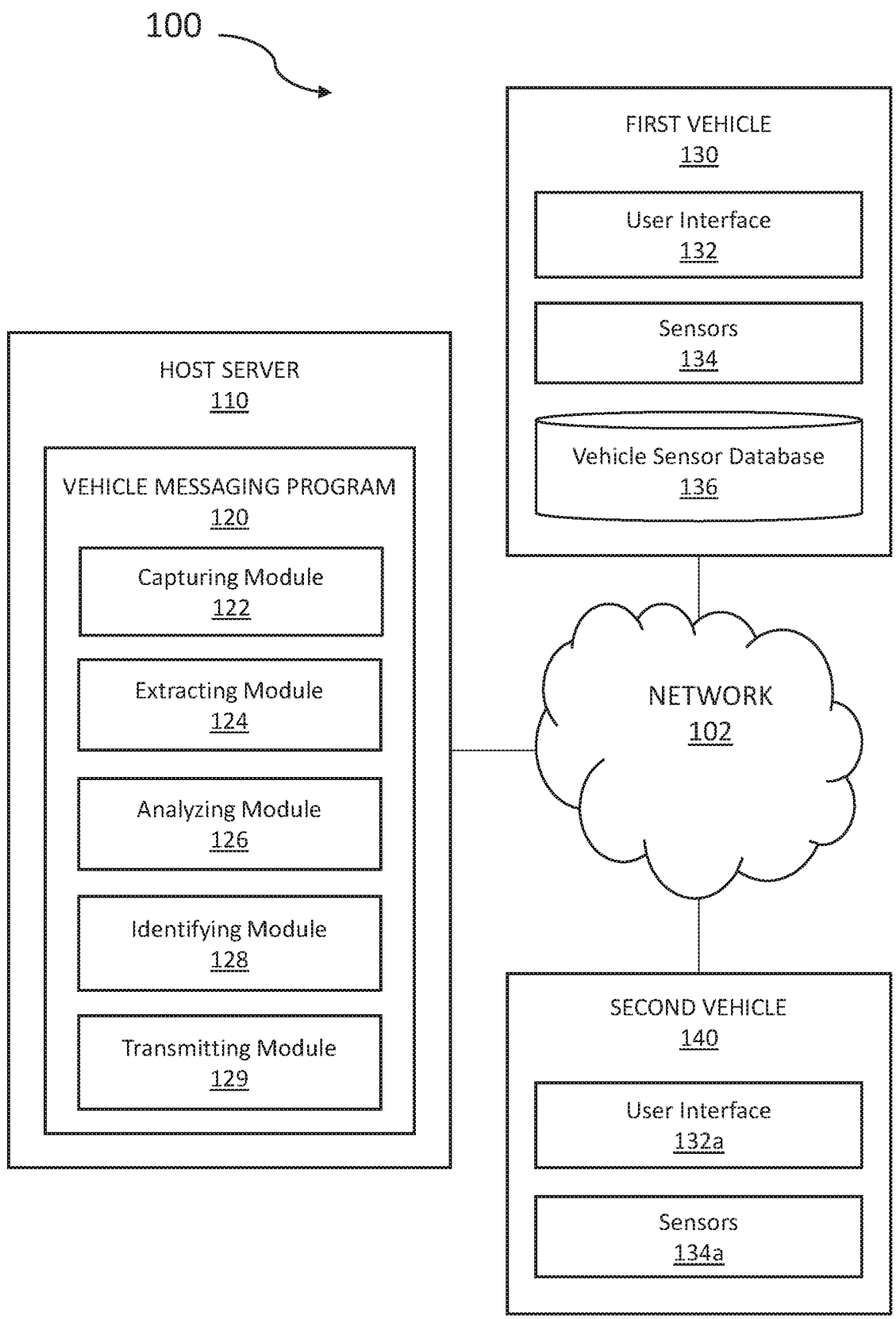
FIG. 1 illustrates a vehicle messaging computing environment, in accordance with an embodiment of the present disclosure.

FIG. 1 illustrates vehicle messaging computing environment 100, in accordance with an embodiment of the present disclosure. Vehicle messaging computing environment 100 includes host server 110, first vehicle 130, and second vehicle 140 all connected via network 102. The setup in FIG. 1 represents an example embodiment configuration for the present disclosure, and is not limited to the depicted setup in order to derive benefit from the present disclosure.

In an exemplary embodiment, host server 110 includes vehicle messaging program 120. In various embodiments, host server 110 may be a laptop computer, tablet computer, netbook computer, personal computer (PC), a desktop computer, a personal digital assistant (PDA), a smart phone, a server, or any programmable electronic device capable of communicating with first vehicle 130 and second vehicle 140 via network 102. Host server 110 may include internal and external hardware components, as depicted and described in further detail below with reference to FIG. 3. In other embodiments, host server 110 may be implemented in a cloud computing environment, as described in relation to FIGS. 4 and 5, herein. Host server 110 may also have wireless connectivity capabilities allowing the host server 110 to communicate with first vehicle 130, second vehicle 140, and other computers or servers over network 102.

With continued reference to FIG. 1, first vehicle 130 includes user interface 132, sensors 134, and vehicle sensor database 136. In exemplary embodiments, first vehicle 130 may include, but is not limited to, a car, a minivan, a truck, a tractor-trailer, a train, or any road vehicle. In alternative embodiments, first vehicle 130 may be a vehicle that flies in the sky (e.g., airplane, rocket ship, hot-air balloon, hovercraft, etc.), a vehicle that floats on the water (e.g., motorboat, yacht, jet ski, pontoon, freight ship, etc.), and any other vehicle known to one of ordinary skill in the art.

In an exemplary embodiment, first vehicle 130 includes user interface 132 (same as user interface 132a in relation to second vehicle 140), which may be a computer program that allows a user to interact with first vehicle 130 and other connected devices via network 102. For example, user interface 132 may be a graphical user interface (GUI). In addition to comprising a computer program, user interface 132 may be connectively coupled to hardware components, such as those depicted in FIG. 3, for sending and receiving data. In an exemplary embodiment, user interface 132 may be a web browser, however in other embodiments user interface 132 may be a different program capable of receiving user interaction and communicating with other devices, such as host server 110.

In exemplary embodiments, user interface 132 may be presented on a touch screen display, a remote operated display, or a display that receives input form a physical keyboard or touchpad located within first vehicle 130, such as on the dashboard, console, etc. In alternative embodiments, user interface 132 may be operated via voice commands, Bluetooth® (Bluetooth and all Bluetooth-based trademarks and logos are trademarks or registered trademarks of Bluetooth SIG, Inc. and/or its affiliates), a mobile device that connects to first vehicle 130, or by any other means known to one of ordinary skill in the art. In exemplary embodiments, a user may interact with user interface 132 to transmit a message, wherein the message is in the form of audio data, video data, image data, text data, and so forth, to second vehicle 140. In various embodiments, a user may interact with user interface 132 to provide user feedback to vehicle messaging program 120, via network 102.

In exemplary embodiments, first vehicle 130 includes one or more sensors 134 (same as sensors 134a in relation to second vehicle 140). Sensors 134 may be a device, hardware component, module, or subsystem capable of recording, capturing, and detecting events or changes in a user environment, or proximity, and sending the detected data to other electronics (e.g., host server 110), components (e.g., vehicle sensor database 136), or programs (e.g., vehicle messaging program 120) within a system such as vehicle messaging computing environment 100. In various embodiments, the detected data collected by sensors 134 may be instrumental in providing feedback to a third party (e.g., second vehicle 140).

Sensors 134, in exemplary embodiments, may be located within first vehicle 130 and may be a global positioning system (GPS), software application, proximity sensor, camera, microphone, light sensor, infrared sensor, weight sensor, temperature sensor, tactile sensor, motion detector, optical character recognition (OCR) sensor, occupancy sensor, heat sensor, analog sensor (e.g., potentiometers, force-sensing resistors), radar, radio frequency sensor, quick response (QR) code, video camera, digital camera, Internet of Things (IoT) sensors, lasers, gyroscopes, accelerometers, actuators, structured light systems, user tracking sensors (e.g., eye, head, hand, and body tracking positions of a user), and other devices used for measuring, detecting, recording an environment or current state of the user and/or the physical environment of the user.

In exemplary embodiments, sensors 134 are capable of continuously monitoring, collecting, and saving collected data on a local storage, such as vehicle sensor database 136, or sending the collected data, or snippets of the collected data, to vehicle messaging program 120. In alternative embodiments, sensors 134 may be capable of detecting, communicating, pairing, or syncing with internet of things (IoT) devices, thus creating opportunities for more direct integration of the physical world into computer-based systems, and resulting in improved efficiency, accuracy, and economic benefit in addition to reduced human intervention.

In various embodiments, sensors 134 are embedded within first vehicle 130 and/or second vehicle 140 (e.g., front, side, rear of first vehicle 130 and/or second vehicle 140) that contain a computer processing unit (CPU), memory, and power resource, and may be capable of communicating with first vehicle 130, second vehicle 140, and host server 110 over network 102.

In exemplary embodiments, vehicle sensor database 136 may be local data storage on first vehicle 130 that contains one or more sets of recorded video/image data that correspond to various snippets of captured data, via sensors 134, from a user's environment. For example, data is continually collected from sensors 134 on first vehicle 130, and may be organized according to each sensor, time of day, month of year, driver of car at the time, and past messages sent to third party vehicles. For example, data sets may be stored in vehicle sensor database 136 as data objects, such as: <rearCam_tailgate_userA_4:45pm_5-19-19>; <frontCam_gasOpen_userB_1:32pm_2-14-19>.

In exemplary embodiments, sensors 134 continually monitor the environment of first vehicle 130 and transmit the collected data, upon user command via user interface 132, to vehicle messaging program 120.

While vehicle sensor database 136 is depicted as being stored on first vehicle 130, in other embodiments, vehicle sensor database 136 may be stored on host server 110, vehicle messaging program 120, or any other device or database connected via network 102, as a separate database. In alternative embodiments, vehicle sensor database 136 may be comprised of a cluster or plurality of computing devices, working together or working separately.

In exemplary embodiments, second vehicle 140 may include the same, or similar components as first vehicle 130, such as a user interface 132a, and sensors 134a. In exemplary embodiments second vehicle 140 may be capable of communicating with first vehicle 130 via vehicle-to-vehicle (V2V) communication, Wireless Fidelity (WiFi), and Radio Frequency Identification (RFID), or by any other means known to one of ordinary skill in the art. Additionally, sensors 134a from second vehicle 140 may be capable of transmitting a message payload, via vehicle messaging program 120, to first vehicle 130, via network 102.

In exemplary embodiments, a driver or passenger in first vehicle 130 may report (e.g., via user interface 132, mobile device, or by any other means known to one of ordinary skill in the art) an observed, or detected, problem with second vehicle 140, via vehicle messaging program 120 over network 102. In various alternative embodiments, multiple vehicles may detect, observe, and report problems associated with second vehicle 140, and transmit the detected, or observed, problems associated with second vehicle 140 to vehicle messaging program 120, via network 102, in order to notify the driver of second vehicle 140 and/or warn other drivers within a proximity of second vehicle 140.

With continued reference to FIG. 1, vehicle messaging program 120, in an exemplary embodiment, may be a computer application on host server 110 that contains instruction sets, executable by a processor. The instruction sets may be described using a set of functional modules. In exemplary embodiments, vehicle messaging program 120 may receive input from first vehicle 130 and second vehicle 140 over network 102. In alternative embodiments, vehicle messaging program 120 may be a computer application contained within first vehicle 130, or a standalone program on a separate electronic device.

With continued reference to FIG. 1, the functional modules of vehicle messaging program 120 include capturing module 122, extracting module 124, analyzing module 126, identifying module 128, and transmitting module 129.

Figure 2:
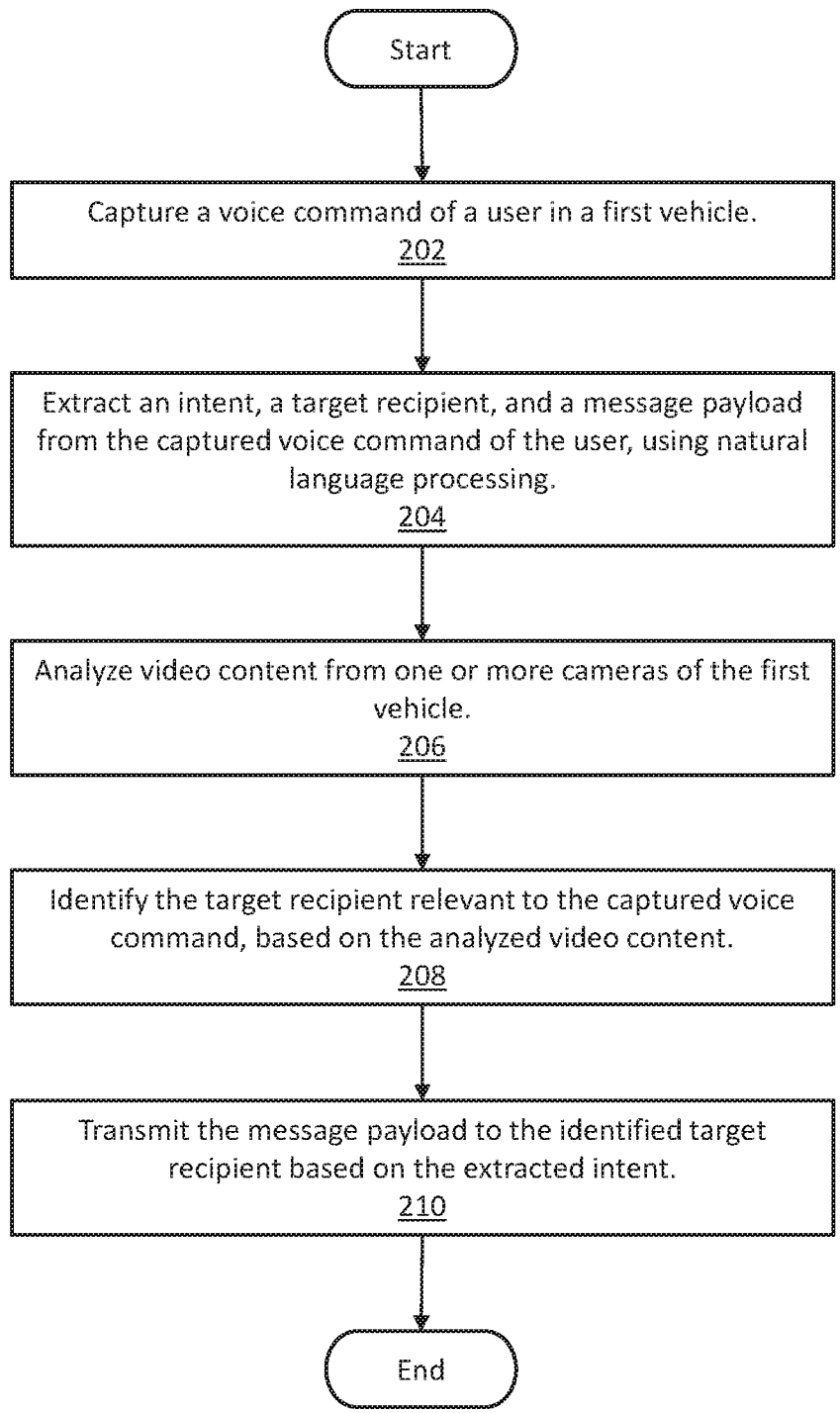
FIG. 2 is a flowchart illustrating the operation of vehicle messaging program 120 of FIG. 1, in accordance with an embodiment of the present disclosure.

FIG. 2 is a flowchart illustrating the operation of vehicle messaging program 120 of FIG. 1, in accordance with embodiments of the present disclosure.

With reference to FIGS. 1 and 2, capturing module 122 includes a set of programming instructions in vehicle messaging program 120, to capture a voice command of a user in a first vehicle (step 202). The set of programming instructions is executable by a processor.

In exemplary embodiments, an event may occur that triggers the user in first vehicle 130 to want to send a message to a specific second vehicle 140 on the road.

In alternative embodiments, a user may press a button on user interface 132, or on the steering wheel of first vehicle 130, to capture a voice command of the user.

With reference to an illustrative example, user A in first vehicle 130 may want to tell user B in second vehicle 140 (green minivan) that they are driving with their gas tank door open. There are two other cars next to first vehicle 130. User A speaks into user interface 132 of first vehicle 130, "Tell green minivan that their gas tank door is open." Capturing module 122 captures user A's voice command.

With continued reference to FIGS. 1 and 2, extracting module 124 includes a set of programming instructions in vehicle messaging program 120, to extract an intent, a target recipient, and a message payload from the captured voice command of the user, using natural language processing (step 204). The set of programming instructions are executable by a processor.

In exemplary embodiments, the target recipient is a second vehicle (e.g., second vehicle 140) within a defined proximity of the first vehicle (e.g., first vehicle 130). A defined proximity may be a pre-configured distance next to first vehicle 130, for example "within 100 feet of first vehicle 130".

In exemplary embodiments, extracting module 124 utilizes natural language processing techniques, known to one of ordinary skill in the art, for analyzing the captured voice commands of the user and extracting a message payload. Examples of natural language processing techniques may include, but are not limited to, machine learning, parsing, part-of-speech tagging, word segmentation, machine translation, relationship extraction, sentiment analysis, word sense disambiguation, speech recognition, and text-to-speech.

With continued reference to the illustrative example above, extracting module 124 extracts "Tell" as the message directive, or intent, "green minivan" as the target recipient, and "gas door is open" as the message payload. User A's captured voice command (i.e., intent, target recipient, and message payload) may be stored as one or more data objects in vehicle actions database 112 as <Tell; #Intent_send_direct_message>, <greenMinivan; @message_targetRecipient>, and <"Gas_door_is_open"; incident_type/message_payload>.

With continued reference to FIGS. 1 and 2, analyzing module 126 includes a set of programming instructions in vehicle messaging program 120, to analyze video content from one or more cameras of the first vehicle (e.g., first vehicle 130) (step 206). The set of programming instructions is executable by a processor.

In exemplary embodiments, analyzing module 126 is capable of receiving video content from the one or more cameras (e.g., sensors 134) of first vehicle 130 and disambiguating the described target recipient, extracted from the captured voice command of the user, in the analyzed video content. The video content history may be a continuous recording of the outside environment of first vehicle 130 via one or more sensors 134, and saved on vehicle sensor database 136, according to date, time, and so forth.

Referring back to the illustrative example above, analyzing module 126 searches the recorded video content, of first vehicle 130, for the last 5-10 seconds of the video feed to identify a matching green minivan within the video feed.

With continued reference to FIGS. 1 and 2, identifying module 128 includes a set of programming instructions in vehicle messaging program 120, to identify the target recipient relevant to the captured voice command, based on the analyzed video content (step 208). The set of programming instructions is executable by a processor.

In exemplary embodiments, identifying module 128 may use various identification techniques, known to one of ordinary skill in the art, such as optical character recognition (OCR), image detection, and so forth, in order to identify the target recipient in the analyzed video content.

In further embodiments, identifying module 128 can identify second vehicle 140 within the defined proximity of first vehicle 130, for communication purposes, based on detecting vehicle-to-vehicle (V2V) sensors between first vehicle 130 and second vehicle 140. In alternative embodiments, identifying module may be capable of detecting Internet of Things (IoT) sensors between first vehicle 130 and second vehicle 140.

In exemplary embodiments, identifying module 128 may be capable of matching a license plate number of second vehicle 140 with the captured voice command of the user identifying the license plate number. For example, identifying module 128 may identify a license plate number of a second vehicle 140 via OCR and in turn receive descriptor characteristics for the second vehicle 140 (e.g., green minivan, etc.), for example from the Department of Motor Vehicles (DMV) database, based on the identified license plate number and information registered with the DMV for the associated license plate number.

In further exemplary embodiments, identifying module 128 may be capable of matching an image of the second vehicle 140 with a verbal description of second vehicle 140 by the user, via one or more natural language processing techniques described herein, and known to one of ordinary skill in the art.

In various embodiments, if multiple images within a video content feed from first vehicle 130 support the identification of the captured voice command of the user, then identifying module 128 can use object detection techniques, known to one of ordinary skill in the art, to select the target recipient that includes the most entities from the captured voice command of the user (e.g., green minivan, bumper sticker). In further embodiments, vehicle messaging program 120 may request from the user additional information to disambiguate the intended target recipient from other potential target recipients identified in the video feed content (e.g., green minivan, bumper sticker, Florida license plate).

With continued reference to the illustrative example above, identifying module 128 identifies and disambiguates the green minivan, in the video content history feed, from the other vehicles on the road within a defined proximity of user A's first vehicle 130. Once identifying module 128 has identified the green minivan as the target recipient to receive the message payload from user A, vehicle messaging program 120 determines the appropriate form of communication to communicate the message payload to the green minivan.

In exemplary embodiments, second vehicle 140 may emit an identifier directly, such as a radio frequency identification (RFID). In other embodiments, first vehicle 130 may communicate with second vehicle 140 via peer-to-peer (P2P) communication, vehicle-to-vehicle (V2V) communication, internet of things (IoT) communications, and any other form of communication known to one of ordinary skill in the art, via network 102.

In exemplary embodiments, RFID tags associated with individual vehicles (e.g., first vehicle 130 and second vehicle 140) may allow a vehicle to query other vehicles, within a defined radius of each other, to determine which vehicle is the green minivan, for example, via information associated with the RFID tag of the vehicle.

With continued reference to FIGS. 1 and 2, transmitting module 129 includes a set of programming instructions in vehicle messaging program 120, to transmit the message payload to the identified target recipient based on the extracted intent (step 210). The set of programming instructions is executable by a processor.

In exemplary embodiments, transmitting module 129 additionally transmits, via P2P communication, one or more segments of the analyzed video content to the identified target recipient, and displays the one or more segments of the analyzed video content on a user interface (e.g., user interface 132a) of the identified target recipient. In this fashion, the user of the identified target recipient (e.g., second vehicle 140) receives the message payload, together with one or more segments of the analyzed video content that points out a reason for the message payload.

Referring back to the illustrative example above, transmitting module 129 transmits the message "Your gas tank door is open" to the green minivan, together with an image of the gas tank door open, via P2P communication over network 102. The user of the green minivan receives the message on their vehicle's user interface (e.g., user interface 132a), or by any other means known to one of ordinary skill in the art. The user of the green minivan may then pull over and close their gas tank door or, alternatively, direct their smart minivan to close the gas tank door while still driving. The user of the green minivan then sends back a message "Thank you" to the driver who sent the message, over network 102.

In alternative embodiments, transmitting module 129 can transmit the message payload to a third party target recipient (e.g., second vehicle 140) via an intermediary recipient (e.g., a third vehicle).

For example, a first driver wants to report a second driver, who is driving a black sedan recklessly. The first driver speaks to their car "Report black sedan for reckless driving." The first driver's car resolves the received message as follows: <Report; #send_3$^{rd}$party_message_intent>, <blackSedan; @message_targetRecipient>, and <"Reckless_driving"; incident_type/message_payload>. Vehicle messaging program 120 analyzes the last 5 seconds of video content in vehicle sensor database 136 and disambiguates the black sedan amongst all of the other cars within a defined proximity of the user's vehicle. Transmitting module 129 sends a message, with a video clip of the reckless driving, to a reporting authority such as the highway patrol.

In various exemplary embodiments, the target recipient (e.g., second vehicle 140) receives a message payload transmitted via transmitting module 129, analyzes the message payload using natural language processing to identify an action to be performed, and performs, automatically, the action via actuators.

In further embodiments, the target recipient (e.g., second vehicle 140) receives a message payload transmitted via transmitting module 129, analyzes the message payload using natural language processing to identify an action to be performed, provides an alert to the user identifying the action to be performed, and performs the identified action, in response to receiving authorization from the user.

In exemplary embodiments, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth® network, a WiFi network, a vehicle-to-vehicle (V2V) network, a vehicle-to-infrastructure (V2I) network, a peer-to-peer (P2P) communication network, a mesh network, or a combination thereof. In general, network 102 can be any combination of connections and protocols that will support communications between host server 110, first vehicle 130, and second vehicle 140.

Figure 3:
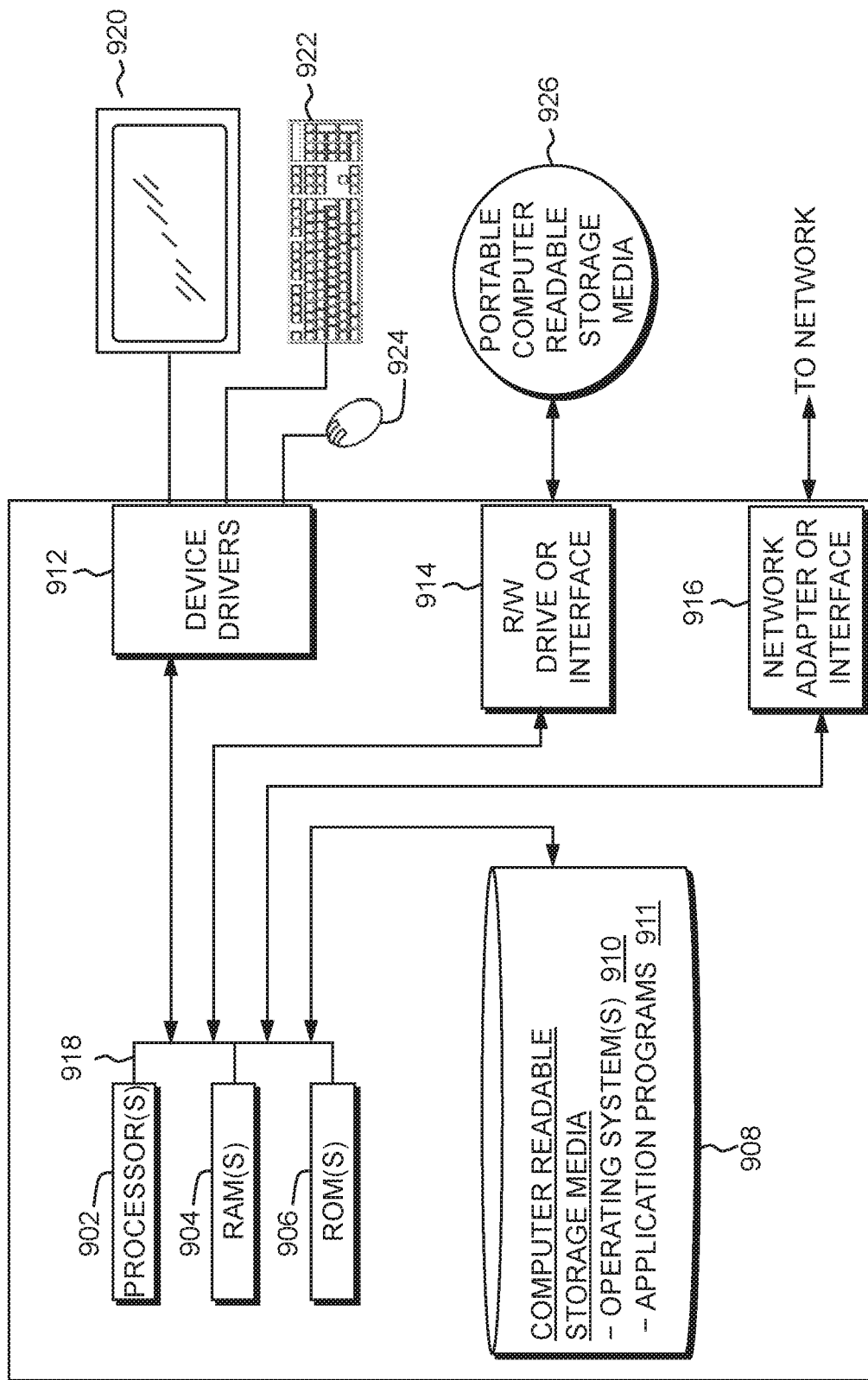
FIG. 3 is a diagram graphically illustrating the hardware components of vehicle messaging computing environment of FIG. 1, in accordance with an embodiment of the present disclosure.

FIG. 3 is a block diagram depicting components of a computing device (such as host server 110, as shown in FIG. 1), in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as vehicle messaging program 120, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 3 may also include a R/W drive or interface 914 to read from and write to one or more portable computer readable storage media 926. Application programs 911 on computing device of FIG. 3 may be stored on one or more of the portable computer readable storage media 926, read via the respective R/W drive or interface 914 and loaded into the respective computer readable storage media 908.

Computing device of FIG. 3 may also include a network adapter or interface 916, such as a TCP/IP adapter card or wireless communication adapter (such as a 4G wireless communication adapter using OFDMA technology). Application programs 911 on computing device of FIG. 3 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
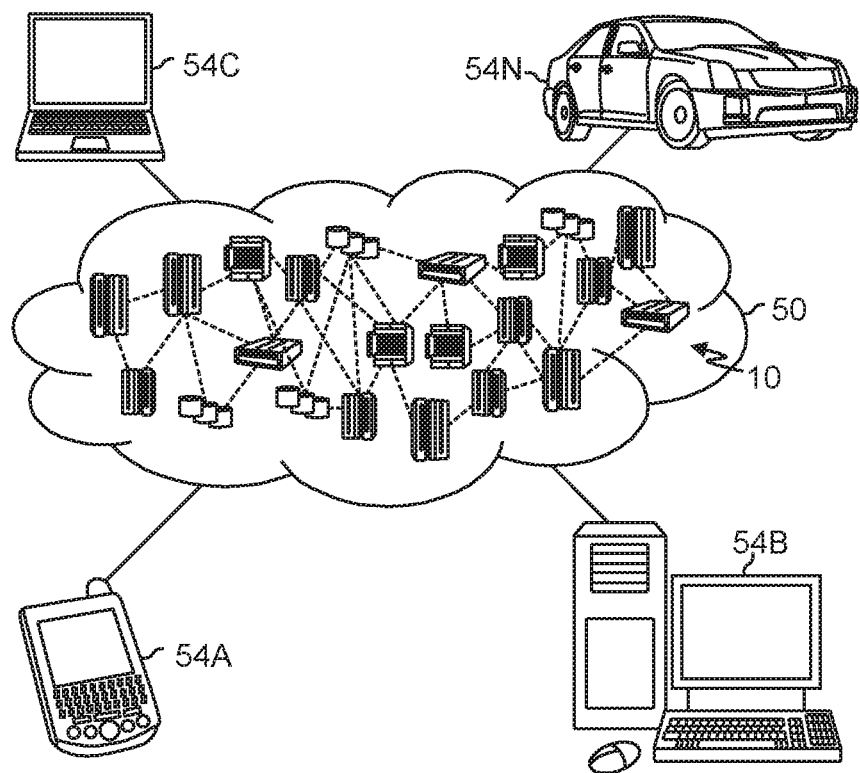
FIG. 4 depicts a cloud computing environment, in accordance with an embodiment of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
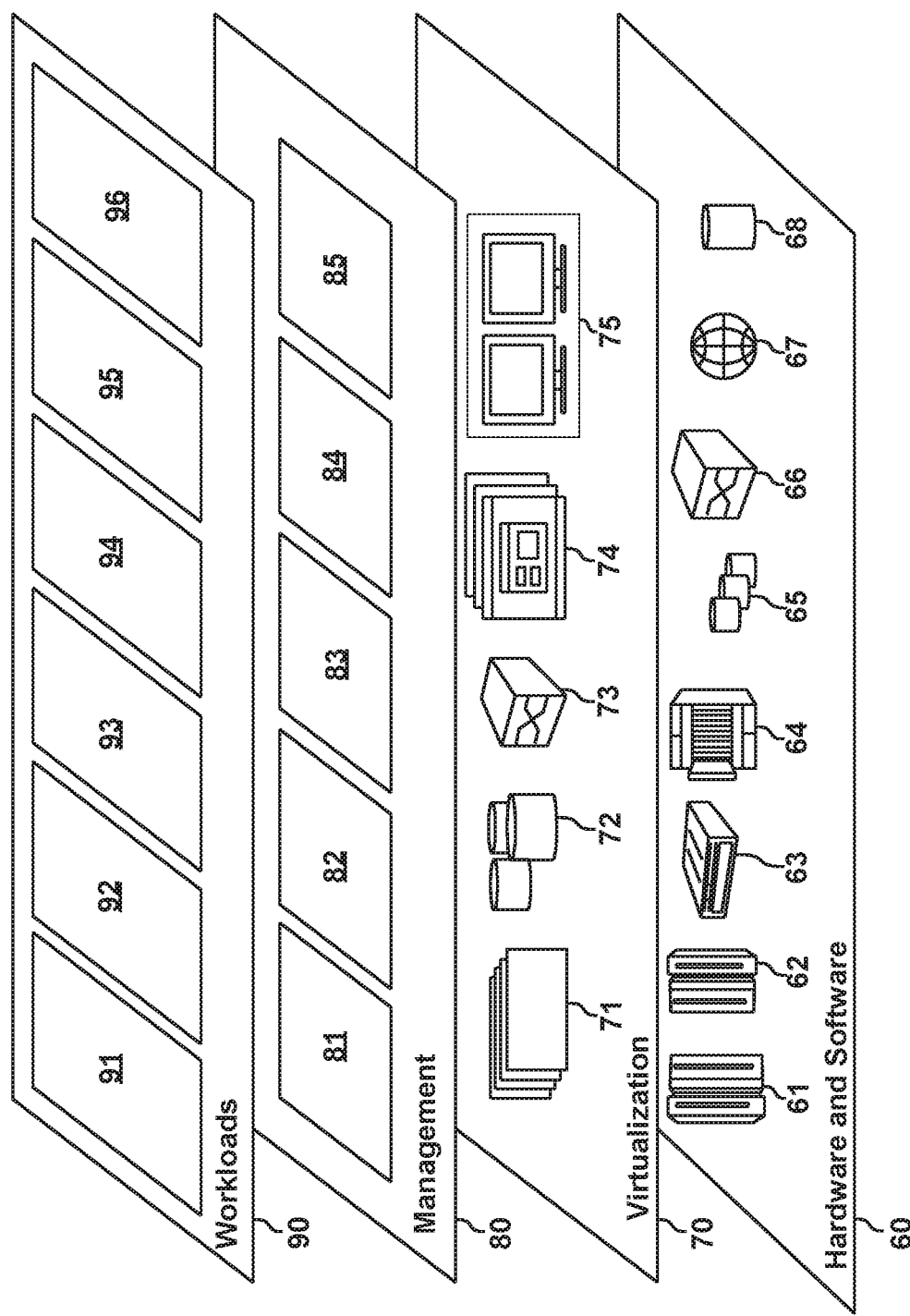
FIG. 5 depicts abstraction model layers of the illustrative cloud computing environment of FIG. 4, in accordance with an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method comprising:
capturing a voice command of a user in a first vehicle;
extracting an intent, a message payload, and a target recipient of the message payload from the captured voice command of the user, using natural language processing, wherein the target recipient is a second vehicle within a defined proximity of the first vehicle;
identifying the target recipient relevant to the captured voice command within video content from one or more cameras of the first vehicle, wherein one or more segments of video content are analyzed to detect one or more images associated with a verbal description of the target recipient in the captured voice command;
matching an image of the second vehicle with a verbal description of the second vehicle by the user, wherein additional information is obtained from at least one or more sensors within the defined proximity of the first vehicle, and the captured voice command to disambiguate the second vehicle associated with the intent of the user from other potential target recipients; and
transmitting, based on a radio-frequency identification tag associated with the second vehicle, the message payload and one or more segments of video content that point out a reason for the message payload to the identified target recipient based on the extracted intent, wherein the reception by the identified target recipient causes an action at the second vehicle that is directed to the identified target recipient and based on an analysis of the message payload.

2. The computer-implemented method of claim 1, wherein identifying the second vehicle within the defined proximity of the first vehicle includes at least one of the following in a group consisting of: detecting vehicle-to-vehicle sensors between the first vehicle and the second vehicle; detecting Internet of Things (IoT) sensors between the first vehicle and the second vehicle; matching a license plate number of the second vehicle with the captured voice command of the user.

3. The computer-implemented method of claim 1, further comprising:
transmitting, via peer-to-peer (P2P) communication, one or more segments of the analyzed video content to the identified target recipient; and
displaying the one or more segments of the analyzed video content on a user interface of the identified target recipient.

4. The computer-implemented method of claim 1, further comprising:
transmitting the message payload to a third party target recipient via an intermediary recipient.

5. The computer-implemented method of claim 1, further comprising:
receiving, by the target recipient, a message payload transmitted from the first vehicle;
analyzing the message payload using the natural language processing to identify an action to be performed; and
performing, automatically, the action via actuators.

6. The computer-implemented method of claim 1, further comprising:
receiving, by the target recipient, a message payload transmitted from the first vehicle;
analyzing the message payload using natural language processing to identify an action to be performed;
providing an alert to the user identifying the action to be performed; and performing the identified action, in response to receiving authorization from the user.

7. A computer program product, comprising a non-transitory tangible storage device having program code embodied therewith, the program code executable by a processor of a computer to perform a method, the method comprising:
capturing a voice command of a user in a first vehicle;
extracting an intent, a message payload, and a target recipient of the message payload from the captured voice command of the user, using natural language processing, wherein the target recipient is a second vehicle within a defined proximity of the first vehicle;
identifying the target recipient relevant to the captured voice command within video content from one or more cameras of the first vehicle, wherein one or more segments of video content are analyzed to detect one or more images associated with a verbal description of the target recipient in the captured voice command;
matching an image of the second vehicle with a verbal description of the second vehicle by the user, wherein additional information is obtained from at least one or more sensors within the defined proximity of the first vehicle, and the captured voice command to disambiguate the second vehicle associated with the intent of the user from other potential target recipients; and
transmitting, based on a radio-frequency identification tag associated with the second vehicle, the message payload and one or more segments of video content that point out a reason for the message payload to the identified target recipient based on the extracted intent wherein the reception by the target recipient causes an action at the second vehicle that is directed to the identified target recipient and based on an analysis of the message payload.

8. The computer program product of claim 7, wherein identifying the second vehicle within the defined proximity of the first vehicle includes at least one of the following in a group consisting of: detecting vehicle-to-vehicle sensors between the first vehicle and the second vehicle; detecting Internet of Things (IoT) sensors between the first vehicle and the second vehicle; matching a license plate number of the second vehicle with the captured voice command of the user.

9. The computer program product of claim 7, further comprising:
transmitting, via peer-to-peer (P2P) communication, one or more segments of the analyzed video content to the identified target recipient; and
displaying the one or more segments of the analyzed video content on a user interface of the identified target recipient.

10. The computer program product of claim 7, further comprising:
transmitting the message payload to a third party target recipient via an intermediary recipient.

11. The computer program product of claim 7, further comprising:
receiving, by the target recipient, a message payload transmitted from the first vehicle;
analyzing the message payload using the natural language processing to identify an action to be performed; and
performing, automatically, the action via actuators.

12. The computer program product of claim 7, further comprising:
receiving, by the target recipient, a message payload transmitted from the first vehicle;
analyzing the message payload using natural language processing to identify an action to be performed;
providing an alert to the user identifying the action to be performed; and
performing the identified action, in response to receiving authorization from the user.

13. A computer system, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
capturing a voice command of a user in a first vehicle;
extracting an intent, a message payload, and a target recipient of the message payload from the captured voice command of the user, using natural language processing, wherein the target recipient is a second vehicle within a defined proximity of the first vehicle;
identifying the target recipient relevant to the captured voice command within video content from one or more cameras of the first vehicle, wherein one or more segments of video content are analyzed to detect one or more images associated with a verbal description of the target recipient in the captured voice command;
matching an image of the second vehicle with a verbal description of the second vehicle by the user, wherein additional information is obtained from at least one or more sensors within the defined proximity of the first vehicle, and the captured voice command to disambiguate the second vehicle associated with the intent of the user from other potential target recipients; and
transmitting, based on a radio-frequency identification tag associated with the second vehicle, the message payload and one or more segments of video content that point out a reason for the message payload to the identified target recipient based on the extracted intent wherein the reception by the target recipient causes an action at the second vehicle that is directed to the identified target recipient and based on an analysis of the message payload.

14. The computer system of claim 13, wherein identifying the second vehicle within the defined proximity of the first vehicle includes at least one of the following in a group consisting of: detecting vehicle-to-vehicle sensors between the first vehicle and the second vehicle; detecting Internet of Things (IoT) sensors between the first vehicle and the second vehicle; matching a license plate number of the second vehicle with the captured voice command of the user.

15. The computer system of claim 13, further comprising:
transmitting, via peer-to-peer (P2P) communication, one or more segments of the analyzed video content to the identified target recipient; and
displaying the one or more segments of the analyzed video content on a user interface of the identified target recipient.

16. The computer system of claim 13, further comprising:
transmitting the message payload to a third party target recipient via an intermediary recipient.

17. The computer system of claim 13, further comprising:
receiving, by the target recipient, a message payload transmitted from the first vehicle;
analyzing the message payload using the natural language processing to identify an action to be performed; and
performing, automatically, the action via actuators.

\* \* \* \* \*